(12) United States Patent
Kumagai et al.

(10) Patent No.: US 9,523,575 B2
(45) Date of Patent: Dec. 20, 2016

(54) GUIDE LIGHT DEVICE, SURVEY APPARATUS HAVING THE GUIDE LIGHT DEVICE, SURVEY SYSTEM USING THE SURVEY APPARATUS, SURVEY POLE USED IN THE SURVEY SYSTEM, AND MOBILE WIRELESS TRANSCEIVER USED IN THE SURVEY SYSTEM

(75) Inventors: Kaoru Kumagai, Toyko (JP); Minoru Chiba, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 919 days.

(21) Appl. No.: 13/428,722

(22) Filed: Mar. 23, 2012

(65) Prior Publication Data
US 2012/0242830 A1    Sep. 27, 2012

(30) Foreign Application Priority Data

Mar. 25, 2011    (JP) .................................. 2011-067629

(51) Int. Cl.
*G01C 15/00*    (2006.01)
*G01S 17/48*    (2006.01)
(Continued)

(52) U.S. Cl.
CPC .......... *G01C 15/004* (2013.01); *G01C 15/002* (2013.01); *G01C 15/02* (2013.01); *G01S 17/42* (2013.01); *G01S 17/48* (2013.01)

(58) Field of Classification Search
None
See application file for complete search history.

(56) References Cited

U.S. PATENT DOCUMENTS 5,457,890 A * 10/1995 Mooty ................. G01C 15/002
33/293
5,760,909 A * 6/1998 Nichols ........................ 356/4.08
(Continued)

FOREIGN PATENT DOCUMENTS

EP        1061335 A2    12/2000
EP        1503176 A2     2/2005
(Continued)

OTHER PUBLICATIONS

An Office Action; "Notice of Reasons for Rejection," issued by the Japanese Patent Office on Jan. 6, 2015, which corresponds to Japanese Patent Application No. 2011-067629 and is related to U.S. Appl. No. 13/428,722.

(Continued)

*Primary Examiner* — Geepy Pe
*Assistant Examiner* — William Adrovel
(74) *Attorney, Agent, or Firm* — Studebaker & Brackett PC

(57) ABSTRACT

A survey apparatus includes a guide light emitting optical system emitting a fan-like visible laser light elongated in upward and downward directions as a guide light, a cylindrical part having a scanning optical system searching a corner reflector provided on a survey pole and a ranging optical system measuring a distance to the corner reflector, a driving part rotating the cylindrical part about a vertical axis in a horizontal direction and rotating the cylindrical part about a horizontal axis, and an angle measurement part measuring a direction of the cylindrical part. The guide light emitting optical system is rotated about the vertical axis in a horizontal direction integrally with the cylindrical part.

7 Claims, 17 Drawing Sheets

(51) Int. Cl.
*G01S 17/42* (2006.01)
*G01C 15/02* (2006.01)

(56) References Cited

U.S. PATENT DOCUMENTS

| | | |
|---|---|---|
| 6,016,455 A | 1/2000 | Ohtomo et al. |
| 2001/0023766 A1* | 9/2001 | Ohtomo et al. ............... 172/4.5 |
| 2004/0246498 A1* | 12/2004 | Kumagai et al. ............. 356/614 |
| 2005/0254044 A1 | 11/2005 | Sugiura et al. |
| 2005/0280802 A1* | 12/2005 | Liu ............................... 356/5.01 |
| 2006/0197944 A1* | 9/2006 | Yasutomi et al. ......... 356/141.3 |
| 2009/0237639 A1 | 9/2009 | Shinozaki et al. |
| 2009/0241359 A1* | 10/2009 | Hayashi et al. ................ 33/284 |
| 2010/0212169 A1* | 8/2010 | Fleenor et al. ................. 33/228 |
| 2011/0043515 A1 | 2/2011 | Stathis |
| 2011/0090051 A1* | 4/2011 | Barker et al. ................... 340/8.1 |
| 2011/0302796 A1* | 12/2011 | Schubert ..................... 33/366.11 |
| 2012/0272536 A1* | 11/2012 | Nishita ........................... 33/290 |

FOREIGN PATENT DOCUMENTS

| | | |
|---|---|---|
| JP | H05-028925 U | 4/1993 |
| JP | H07-174557 A | 7/1995 |
| JP | H11-236717 A | 8/1999 |
| JP | H11-304465 A | 11/1999 |
| JP | 2005-043088 A | 2/2005 |
| JP | 2009-229222 A | 10/2009 |

OTHER PUBLICATIONS

The extended European search report issued by the European Patent Office on Apr. 9, 2015, which corresponds to European Patent Application No. 12161077.8-1557 and is related to U.S. Appl. No. 13/428,722.

\* cited by examiner

GUIDE LIGHT DEVICE, SURVEY
APPARATUS HAVING THE GUIDE LIGHT
DEVICE, SURVEY SYSTEM USING THE
SURVEY APPARATUS, SURVEY POLE USED
IN THE SURVEY SYSTEM, AND MOBILE
WIRELESS TRANSCEIVER USED IN THE
SURVEY SYSTEM

CROSS REFERENCE TO RELATED
APPLICATIONS

The present application is based on and claims priority from Japanese Application Number, 2011-067629, filed on Mar. 25, 2011, the disclosure of which is hereby incorporated by reference herein in its entirety.

BACKGROUND OF THE INVENTION

Field of the Invention

The present invention relates to a guide light device, a survey apparatus having the guide light device, a survey system using the survey apparatus, a survey pole used in the survey system, and a mobile wireless transceiver used in the survey system.

Description of the Related Art

In a survey apparatus performing a measurement of a distance and an angle, a conventional guide light device which emits a guide light to indicate a collimation direction of the survey apparatus to a survey operator has been known (see Japanese Utility model application publication No H05-28925).

In such a survey apparatus, light emitting diodes which have different colors and are disposed on the other sides in right and left directions from a collimation axis on a horizontal plane as a boundary are emitted. Thereby, the survey operator is guided to a position where the guide lights of the different colors are viewed equally by the survey operator and therefore a target such as a corner reflector which is a reflection prism can be quickly positioned at a vicinity of a setting point to be measured as a target point.

However, in the conventional guide light device as mentioned above, the guide light is emitted as a spot light and therefore when the guide light is emitted at a position out of an eye height of the survey operator, it is difficult for the survey operator to find the guide light. Accordingly, it is not always achieved to find quickly the guide light when the survey operation such as a setting operation is performed at a place which has undulation with difference in height.

Furthermore, since a positional relationship between a current position of the survey operator and a setting point where piling is to be performed, is not always clear, there is a room for improvements in an aspect of the setting operation.

SUMMARY OF THE INVENTION

An object of the present invention is to provide a guide light device which can quickly perform a setting operation, a survey apparatus having the guide light, a survey system using the survey apparatus, a survey pole used in the survey system, and a mobile wireless transceiver.

To achieve the above object, a guide light device according to an embodiment of the present invention includes a guide light emitting optical system emitting a fan-like visible laser light elongated in upward and downward directions as a guide light.

A survey apparatus according to an embodiment of the present invention may include a guide light emitting optical system emitting a fan-like visible laser light elongated in upward and downward directions as a guide light, a cylindrical part having a scanning optical system searching a corner reflector provided on a survey pole and a ranging optical system measuring a distance to the corner reflector, a driving part rotating the cylindrical part about a vertical axis in a horizontal direction and rotating the cylindrical part about a horizontal axis, and an angle measurement part measuring a direction of the cylindrical part. The guide light emitting optical system is rotated about the vertical axis in a horizontal direction integrally with the cylindrical part.

DETAILED DESCRIPTION OF THE PREFERRED EMBODIMENTS

A survey apparatus having a guide light device according to an embodiment of the present invention and a survey system using the survey apparatus, a survey pole used in the survey system and a mobile wireless transceiver used in the survey system will be explained hereinafter in detail with reference to the attached drawings.

EMBODIMENTS

Configuration of Survey Apparatus

Figure 1:
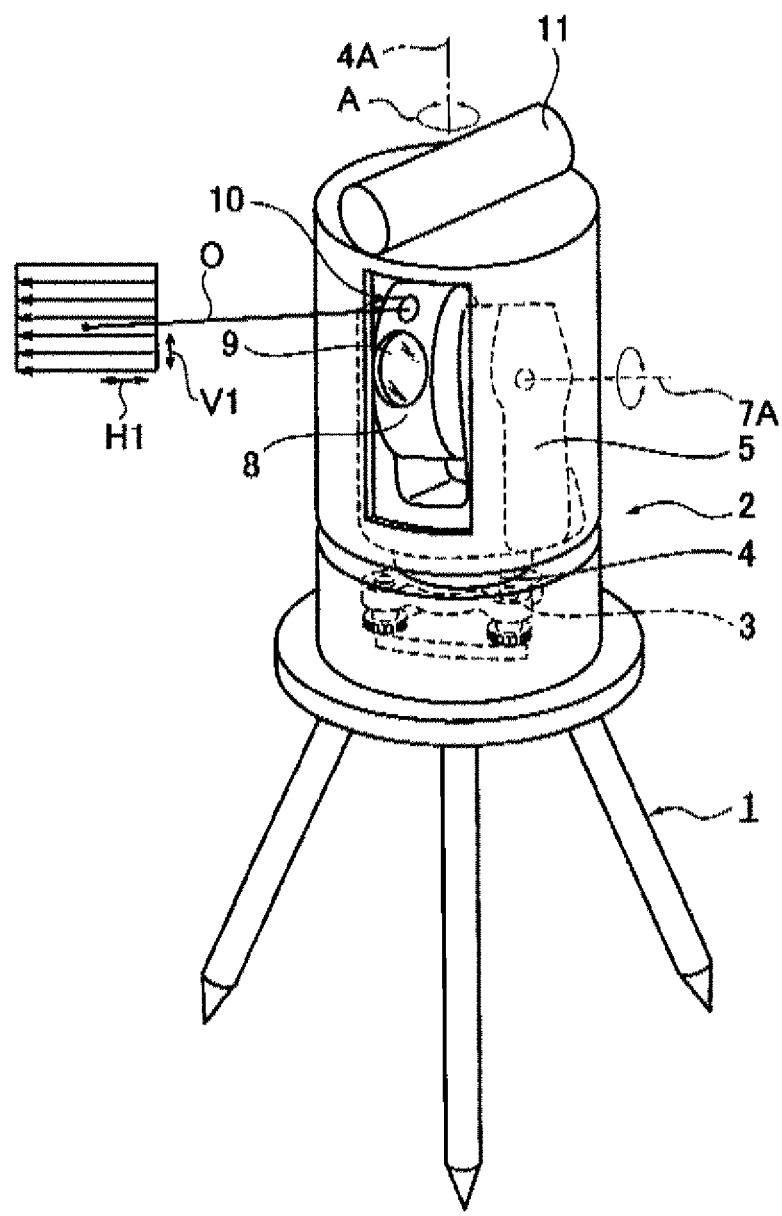
FIG. 1 is a perspective view showing a schematic configuration of a survey apparatus according to an embodiment of the present invention.

In FIG. 1, reference numeral 1 indicates a tripod stand and 2 the survey apparatus. The survey apparatus 2 is provided on the tripod stand 1 via a base part 3. The base part 3 has a collimation adjusting screw. The survey apparatus 2 has a mounting part 4.

Figure 9:
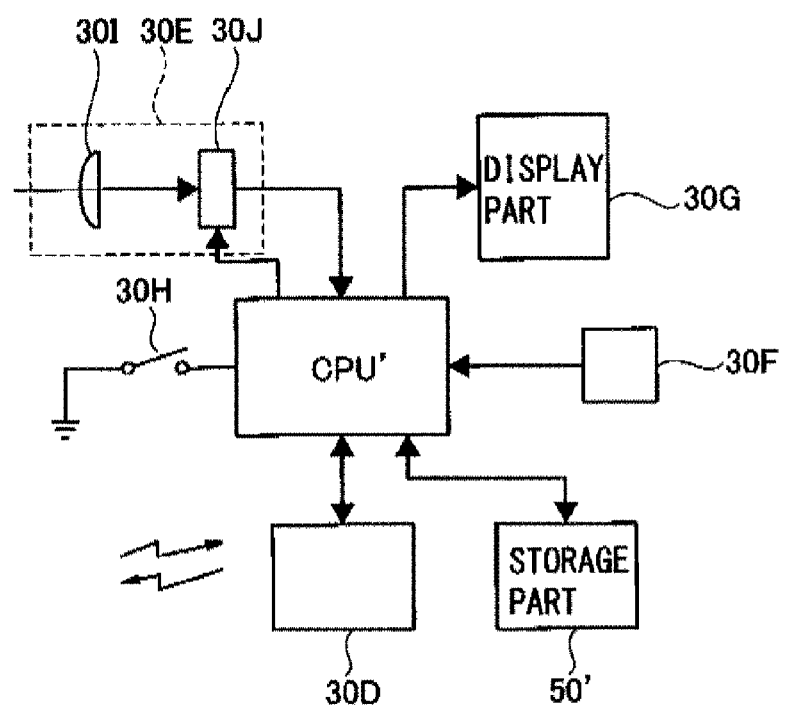
FIG. 9 is a block circuit diagram of the mobile wireless transceiver shown in FIG. 8.

The survey apparatus 2 is disposed on a known reference point and design data indicating a positional relationship with setting points is stored in a memory part 50' of a later-described mobile wireless transceiver 30C (see FIG. 9).

The mounting part 4 is rotated about a vertical rotational shaft 4A in relation to the base part 3 in a horizontal direction shown by arrow A. On the mounting part 4, a support stand part 5 is provided. On the support stand part 5, a rotation horizontal shaft 7A is provided.

On the horizontal rotation shaft 7A, a cylindrical part 8 is provided. The cylindrical part 8 is rotated in a horizontal direction by the rotation of the mounting part 4 and in a vertical direction by the rotation of the rotation horizontal shaft 7A.

On the cylindrical part 8, a ranging optical system 9 and a scanning optical system 10 are provided.

A non-illustrated encoder for obtaining accurately a rotational angle when the mounting part 4 is rotated about the vertical rotation shaft 4A and a non-illustrated encoder for obtaining accurately a rotational angle when the cylindrical part 8 is rotated about the rotation horizontal shaft 7A are provided.

Accordingly, an optical axis direction of an optical system of the cylindrical part 8 is obtained by measuring angles by using the encoders.

Prior to the ranging optical system 9 and the scanning optical system 10, the guide light device is described.

(Example of Design Data)

Figure 7:
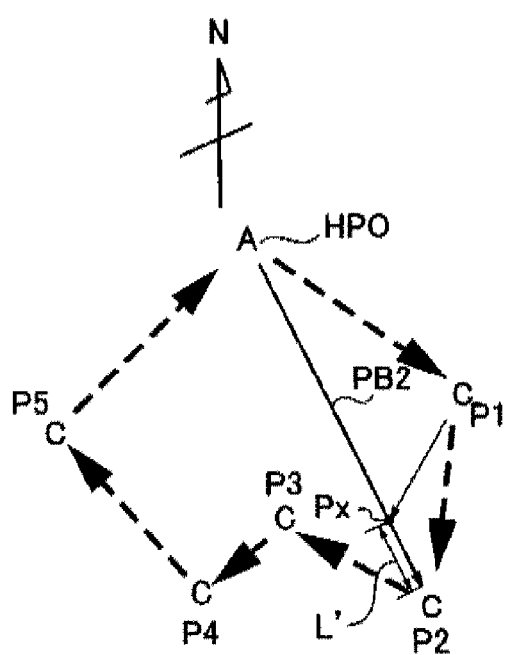
FIG. 7 is an explanatory view showing an example of design data.

The design data is, for example, map data based on a direction, for example, azimuth direction N. In this embodiment, the design data is, as shown in FIG. 7, a position HPO of the survey apparatus 2, setting points P1, P2, P3, P4, and P5 in each of which piling is to be performed and angles thereof with respect to the direction N of the survey apparatus 2.

(Configuration of Guide Light Device)

At a top of the survey apparatus 2, a guide light emitting part 11 as the guide light device is provided.

The guide light emitting part 11 may be configured to be rotated in a horizontal direction integrally together with the survey apparatus 2 according to the rotation of the mounting part 4. In this case, an emitting direction of the guide light is constantly the same as a direction of the optical axis of the cylindrical part 8 in a horizontal angle.

Figure 2:
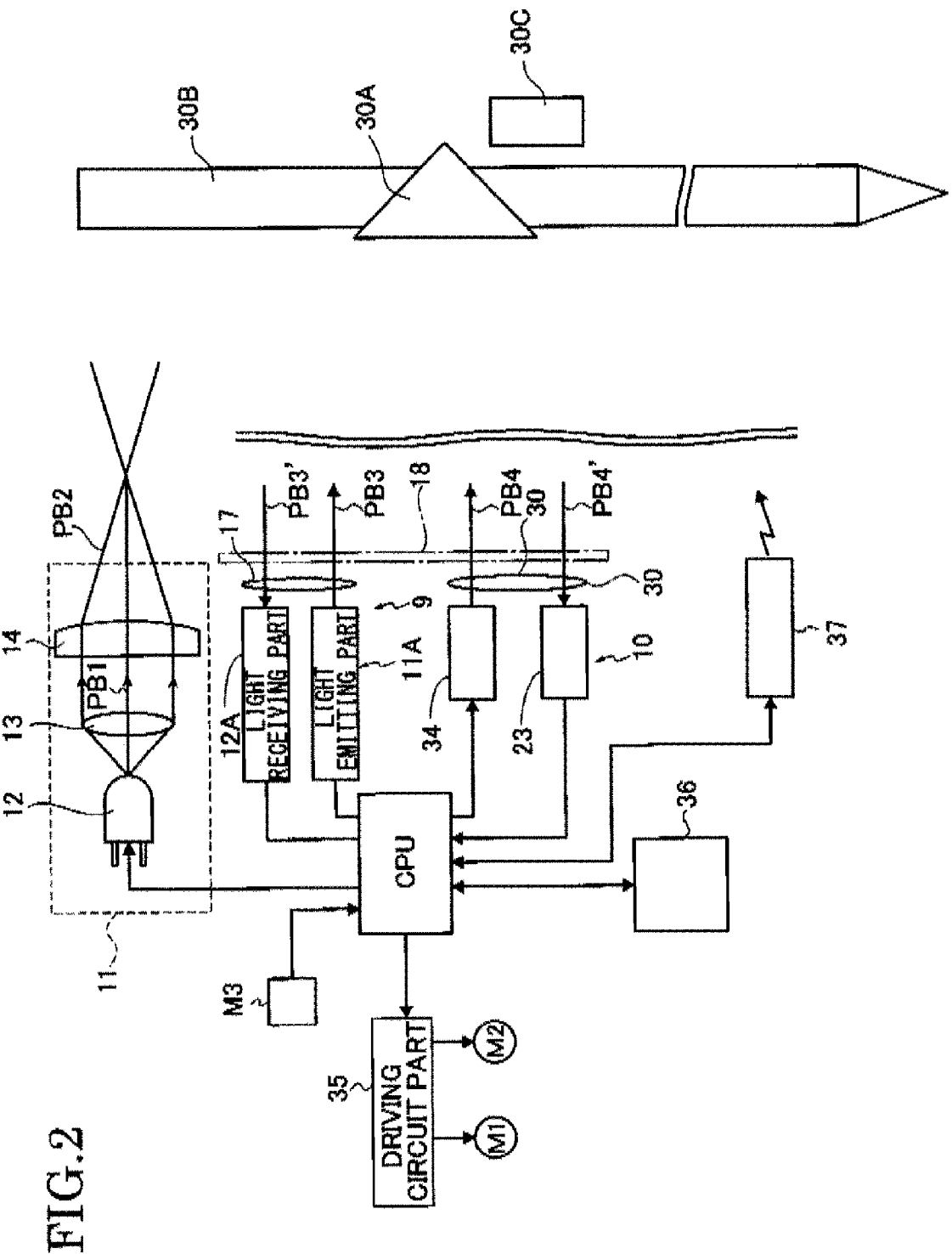
FIG. 2 is a block diagram showing an internal configuration of the survey apparatus used in a survey system according to an embodiment of the present invention.
Figure 3:
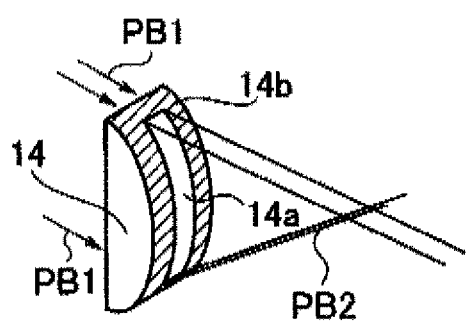
FIG. 3 is a perspective view showing an example of a cylindrical lens shown in FIG. 2.

The guide light emitting part 11 includes, as shown in FIG. 2, for example, a laser light source 12, a collimator lens 13, and a guide light emitting optical system which has a cylindrical lens 14 shown in FIG. 3. The laser light source 12 generates, for example, a visible red laser light.

The collimator lens 13 is configured to convert the visible red laser light into a parallel light flux PB1. The cylindrical lens 14 is configured to convert the parallel light flux PB1 into a fan-like guide light PB2 elongated in a vertical direction.

The cylindrical lens 14 has, for example, as shown in FIG. 3, a slit opening 14a largely elongated in a direction having a power formed on an exit surface and the other part which is a mask area 14b.

The laser light source 12 is controlled by a control circuit CPU shown in FIG. 2, and starts to emit light when a non-illustrated power switch is turned on. Functions of the control circuit CPU will be described later in detail.

The direction of the survey apparatus 2 is initially set such that the survey apparatus 2 is disposed in a position HPO and directed toward north. In this case, for example, a compass or a magnet as a commercially available direction sensor or a direction sensor M3 (see FIG. 2) provided on the survey apparatus 2 may be used.

In case where a commercially available magnet is used, for example, the mounting part 4 is set such that the cylindrical part 8 is directed toward north of the magnet by rotating the rotation vertical shaft 4A to perform an initial setting of the direction angle.

(Configuration of Ranging Optical System 9)

Figure 4:
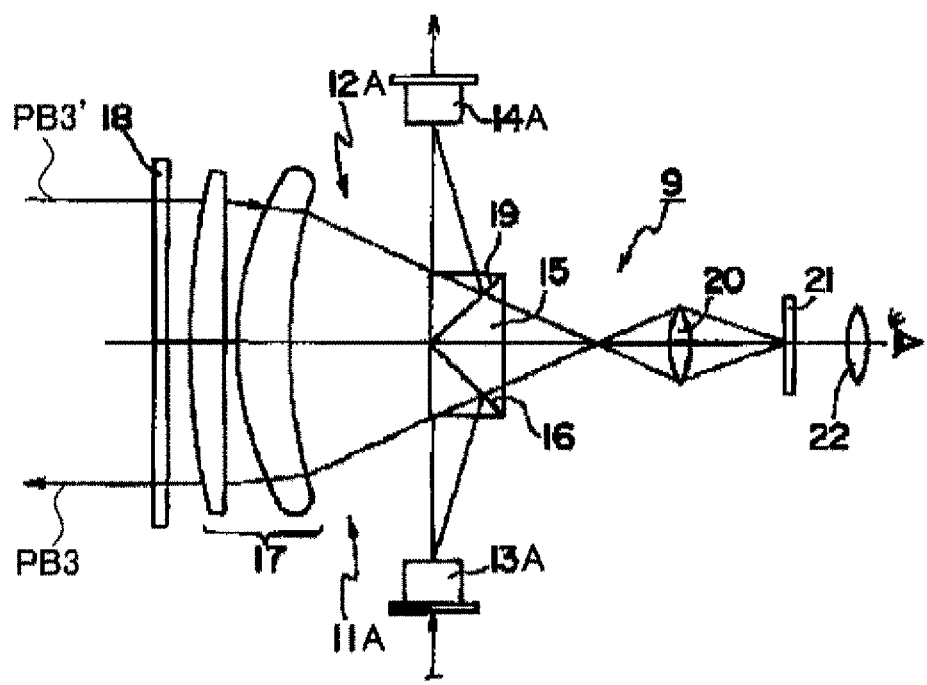
FIG. 4 is an optical diagram showing an example of a ranging optical system shown in FIG. 2.

The ranging optical system 9 has, as schematically shown in FIG. 4, a light emitting part 11A and a light receiving part 12A. The light emitting part 11A has a light source 13A. The light receiving part 12A has a light receiving element 14A.

The light source 13A emits an infrared laser light flux. The infrared laser light flux is reflected on a dichroic mirror 16 of a beam splitter 15 toward an objective lens 17 and emitted from the cylindrical part 8 via a cover glass 18 as a parallel light flux PB3.

The parallel light flux PB3 is reflected on the corner reflector 30A as a target shown in FIG. 2, returns to the objective lens 17 via the cover glass 18 as a reflected light PB3', is reflected by a dichroic mirror 19 of the beam splitter 15, and then is focused onto the light receiving element 14A.

The ranging optical system 9 has an imaging lens 20 and a reticle plate 21. A visible light transmits the objective lens 17 and the dichroic mirrors 16, 19, reaches the imaging lens 20, and is focused on the reticle plate 21 so that the survey operator can visually confirm a vicinity of the setting point and the corner reflector 30A via an eyepiece lens 22 but such an optical configuration is not necessarily required.

A light receiving output of the light receiving element 14A is input to an arithmetic part of the control circuit CPU. The control circuit CPU calculates a distance to the corner reflector 30A based on the light receiving output of the light receiving element 14A. The corner reflector 30A is fixed on the survey pale 30B and the detailed configuration of the survey pole 30B will be described later.

(Configuration of Scanning Optical System 10)

Figure 5:
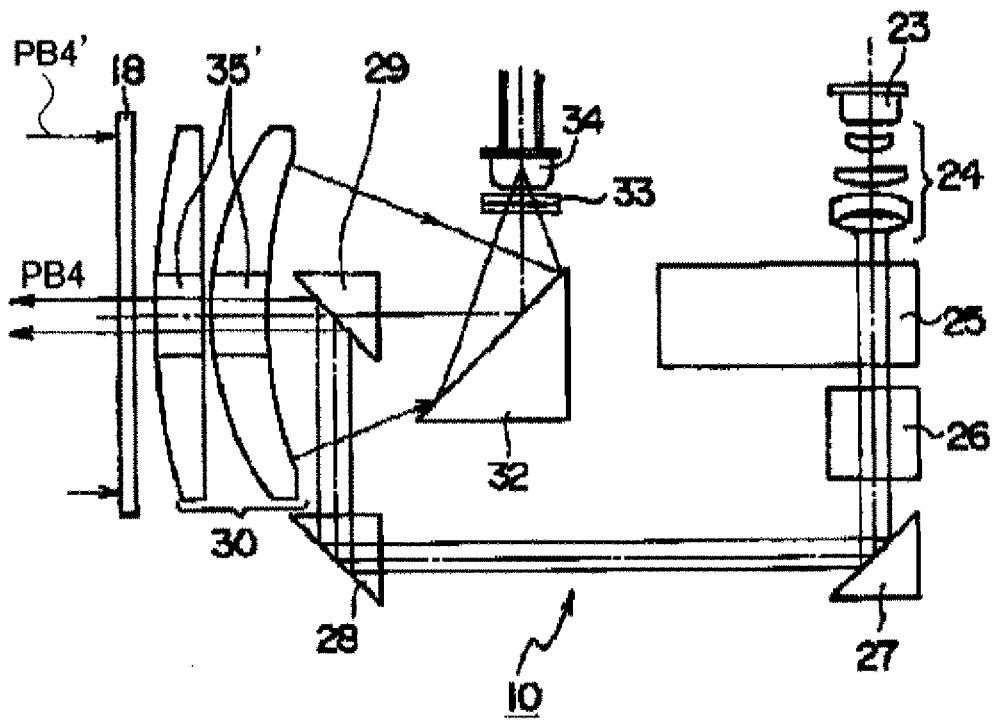
FIG. 5 is an optical diagram showing an example of a scanning optical system shown in FIG. 2.

The scanning optical system 10 is used to lock the corner reflector 30A. The scanning optical system 10 has, as shown in FIG. 5, a laser diode 23, a collimator lens 24, a horizontal direction deflection element 25, a vertical direction deflection element 26, reflection prisms 27, 28, 29, an objective lens 30, the cover glass 18, a reflection prism 32, a noise light reduction filter 38, and a light receiving element 34.

The laser diode 23, the collimator lens 24, the horizontal direction deflection element 25, the vertical direction deflection element 26, and the reflection prisms 27, 28, 29 substantially form a light emitting part. The objective lens 30, the reflection prism 32, the noise light reduction filter 33, and the light receiving element 34 substantially form a light receiving part. The horizontal direction deflection element 25 and the vertical direction deflection element 26 include, for example, an acousto-optic element.

The laser diode 23 emits an infrared laser light PB4 which has a different wavelength from that of the ranging light of the ranging optical system 9. The infrared laser light PB4 is converted into a parallel light flux by the collimator lens 24 and led to the horizontal direction deflection element 25.

Figure 6:
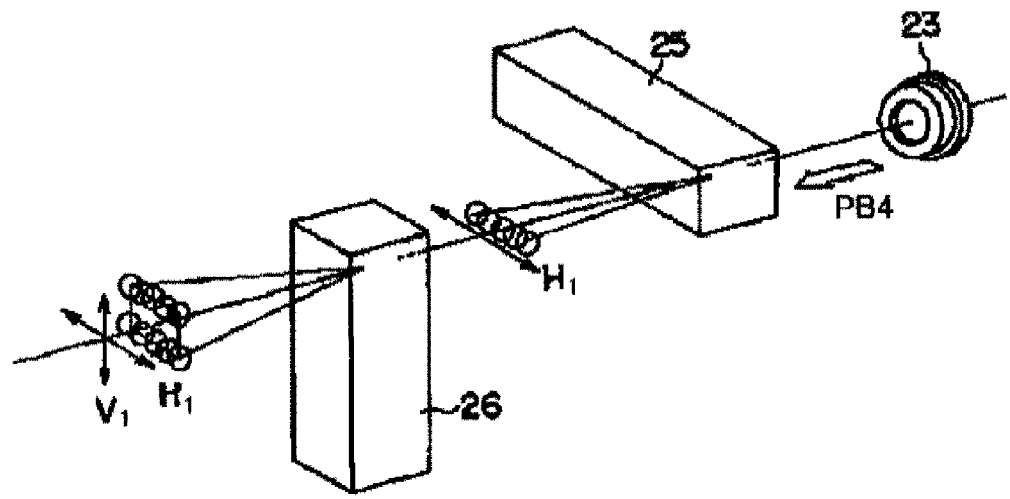
FIG. 6 is a perspective view showing an example of an acousto optic element shown in FIG. 5.

The horizontal direction deflector element 25 has, as shown in FIG. 6, a function of deflecting the infrared laser light PB4 in a horizontal direction H1, and the vertical direction deflection element 26 has a function of deflecting the infrared laser light PB4 in a vertical direction V1. The infrared laser light PB4 is deflected in the horizontal direction by the horizontal direction deflection element 25 and the vertical direction by the vertical direction deflection element 26, led to the reflection prism 26, reflected on the reflection prism 26, and led to the objective lens 30 via the reflection prisms 28, 29.

The objective lens 30 has a through-hole 35' formed coaxially with the optical axis of the objective lens 30. The infrared laser light PB4 reflected on the reflection prism 29 passes through the through-hale 35' and is emitted out of the survey apparatus 2 to perform a scanning for searching the corner reflector 30A by the infrared laser light P84. When the corner reflector 30A is positioned within a searching range, the infrared laser light PB4 is reflected on the corner reflector 30A and returns to the objective lens 30.

The reflection light PB4' of the infrared laser light PB4 is focused on the objective lens 30, reflected on the reflection prism 32, passes through the noise light reduction filter 33 and then is imaged on the light receiving element 34. The noise light reduction filter 33 has a function of transmitting light having the same wavelength as that of the infrared laser beam.

Thereby, the searching shown in FIG. 1 is performed. In FIG. 1, the reference numeral O indicates an optical axis of the scanning optical system 10, V1 a vertical direction, and H1 a horizontal direction. In this embodiment, the searching is performed in a range of an angle width of 4.5 degrees in the horizontal direction and an angle width of 3 degrees in the vertical direction.

(Configuration of Driving Part)

The survey apparatus 2 has a driving circuit part 35 shown in FIG. 2. A horizontal direction driving motor M1 and a vertical direction driving motor M2 are connected to the driving circuit part 35. The horizontal direction driving motor M1 has a function of rotating the cylindrical part 8 in the horizontal direction. The vertical direction driving motor M2 has a function of rotating the cylindrical part 8 in the vertical direction.

The driving circuit part 35 is controlled by the control circuit CPU. The control circuit CPU has a function of outputting a rotation permission signal of the horizontal direction driving motor M1 toward the driving circuit part 35 when the later-described wireless transceiver part receives a cylindrical part rotation permission signal.

The direction sensor M3 is connected to the control circuit CPU. In this embodiment, an initial setting of the direction of the guide light PB2 to be directed is performed by using the direction sensor M3 instead of using a commercially available.

The control circuit CPU calculates a rotation angle in the horizontal direction from the current angle of the cylindrical part 8 of the survey apparatus 2 in the horizontal direction to the next setting point according to a direction signal of the direction sensor M3 and the later-described rotation permission signal.

That is, a direction where the guide light PB2 is to be emitted from the direction where the survey apparatus 2 currently emits the guide light PB2 is calculated and obtained.

Thereby, the cylindrical part 8 is rotated in the horizontal direction in a direction toward a position where the later-described next setting point exists and the rotation of the cylindrical part 8 is capable of stopping.

(Example of Function of Control Circuit CPU)

The control circuit CPU has a function of outputting the rotation permission signal of the vertical direction driving motor M2 toward the driving circuit part 35 when rotation of the cylindrical part 8 in a direction toward the next setting point to be next set stops. The driving circuit part 35 has a function of alternately inversely rotating the vertical direction driving motor M2 and thereby, the infrared laser light PB4 is scanned and reciprocated in upward and downward directions at the later-described next setting point.

When the survey operator is positioned at a position in the emitting direction of the guide light PB2, the control circuit CPU locks the corner reflector 30A and performs a distance measurement of the corner reflector or measurements of a distance and an angle of the corner reflector 30.

Then, the control circuit CPU calculates and obtains a distance to the corner reflector 30A or the distance and the angle in a three-dimensional coordinate. Distance data from the current position of the corner reflector 30A to the survey apparatus 2 or the distance data and angle data in a three-dimensional coordinate are once stored in a storage part 36 as measurement data.

The survey apparatus 2 has, as shown in FIG. 2, a wireless transceiver part 37 together with the storage part 36. The storage part 36 and the wireless transceiver part 37 are connected to the control circuit CPU.

The wireless transceiver part 37 has a function of transmitting the current position of the survey operator (the distance data from the survey apparatus 2 to the corner reflector 30A or the distance data and the angle data in the three dimensional coordinate to the mobile wireless transceiver 30C.

The control circuit CPU judges that the corner reflector 30A is locked. The control circuit CPU is configured to turn off the guide light when the corner reflector 30A is locked and turn on the guide light when the lock is released during operation.

(Example of Configuration of Mobile Wireless Transceiver 30C)

Figure 8:
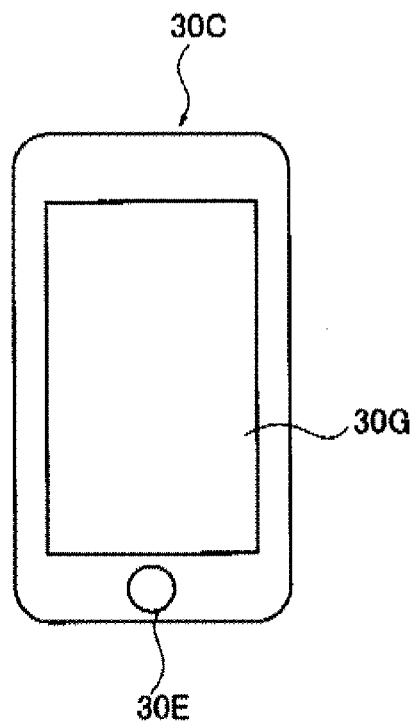
FIG. 8 is a plan view showing an example of a mobile wireless transceiver according to an embodiment of the present invention.

The mobile wireless transceiver 80C has, in this embodiment, a thin rectangular shape as shown in FIG. 8. The mobile wireless transceiver 30C has a control circuit CPU', a storage part 50', a wireless transceiver part 30D, a camera part 30E, a direction sensor 30F, a display part 30G, and a cylindrical part rotation permission button 30H.

Design data is stored in the storage part 50'. The display part 30G has a function of displaying a setting map corresponding to the design data. The control circuit CPU' has a function of constructing a map to be displayed on a screen of the display part 30G based on a direction signal of the direction sensor 30F and the design data.

The control circuit CPU' has a current position HPO of the survey apparatus 2 and the design data of setting points P1 to P5 and therefore can calculate a rotation angle in a horizontal direction with respect to the setting points P1 to P5.

The control circuit CPU' has a function of transmitting a rotation permission signal which is a rotation angle in the horizontal direction from the wireless transceiver part 30D to the survey apparatus 2 when the cylindrical part rotation permission button 30H is turned on.

The camera part 30E is basically formed by an imaging lens 30I and an image pickup device CCD 30J. The control circuit CPU' has a function of switching from a setting map displaying mode to a camera mode when the distance between the next setting point and the current position of the survey operator becomes a predetermined distance, for example, a predetermined value 5 m or less.

The control circuit CPU' controls the display part 30G to display the direction (compass) based on the direction date of the direction sensor 30F. The control circuit CPU' calculates the distance data from the current position of the survey operator to the next setting point, which is obtained by the ranging optical system 9, and the angle data in the three-dimensional coordinate obtained by the angle measurement part, from the distance data and the angle data in the three-dimensional coordinate. The distance data and the angle data are the distance, which is obtained by the ranging optical system 9, and the angle to the corner reflector 30A, respectively. Thereby, a difference of the distances L' (hereinafter, also referred to as difference distance L') between the current position of the survey operator and the next setting point is obtained. The control circuit CPU' has a function of controlling the display part 30G to display the difference distance L' and a function of controlling the display part 30G to display a moving direction GO where the survey operator is to move as a moving direction indicating mark.

(Example of Display of Setting Map on Display Part 30G)

FIGS. 10A to 10D show an example of the setting map displayed on the display part 30G of the mobile wireless transceiver 30C. In this case, the mobile wireless transceiver 30C is held by a right hand.

Figure 10A:
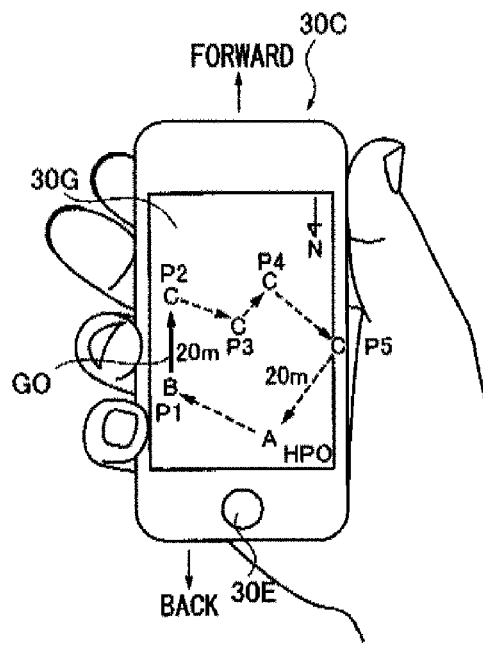
FIG. 10A is an example of a setting map displayed on a display part of the mobile wireless transceiver in a case where a setting point P2 is viewed from a setting point P1.

FIG. 10A shows a state of the setting map immediately after the survey operator changes the direction toward the next setting point P2 while the survey operator stays at the setting point P1.

In the FIGS. 10A to 10D, A indicates a position of the survey apparatus 2, B indicates a point where the setting is completed, and C indicates a point where the setting is not completed.

When the survey operator changes to be directed such that the moving direction GO is directed in back and forth direction on the screen of the display part 30G, the direction N and the setting map are rotated relatively to the screen by the control of the control circuit CPU'. Thereby, the relationship between the setting point P2 where the setting is to be performed and the current position is detected.

Figure 10B:
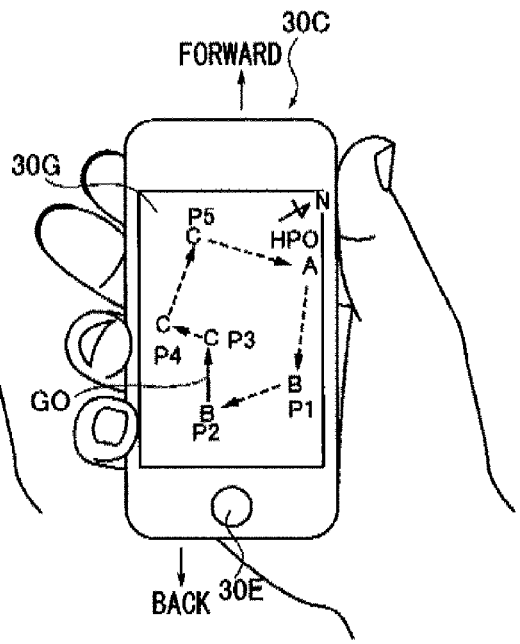
FIG. 10B is an example of a setting map displayed on the display part of the mobile wireless transceiver in a case where a setting point P3 is viewed from the setting point P2.
Figure 10C:
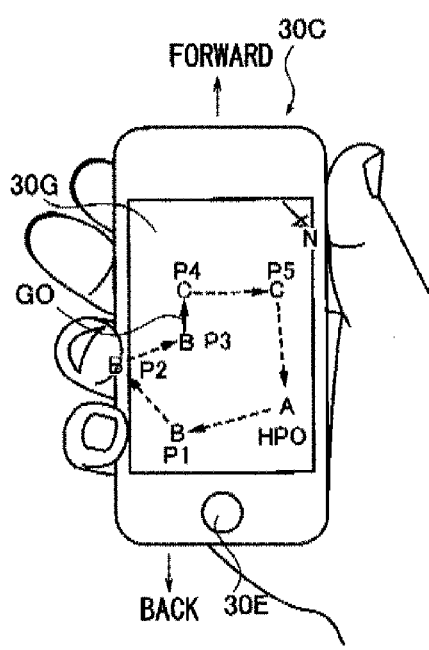
FIG. 10C is an example of a setting map displayed on the display part of the mobile wireless transceiver in a case where a setting point P4 is viewed from the setting point P3.
Figure 10D:
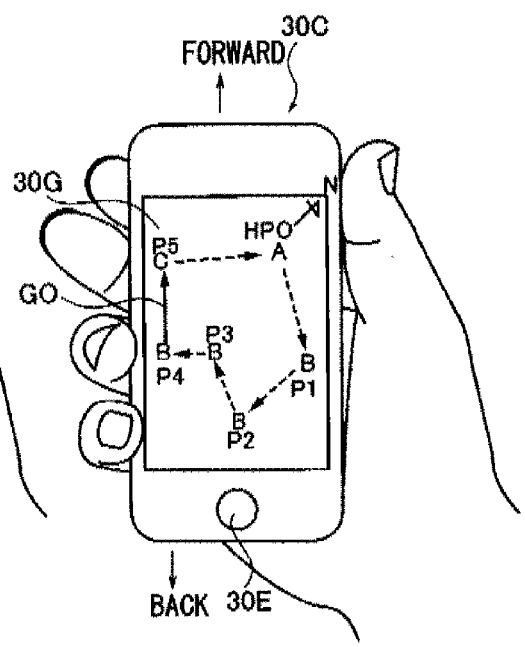
FIG. 10D is an example of a setting map displayed on the display part of the mobile wireless transceiver in a case where a setting point P5 is viewed from the setting point P4.

FIG. 10B shows a state of the setting map immediately after the survey operator changes the direction toward the next setting point P3 while staying at the setting point P2 after the setting of the setting point P2 is completed. FIG. 10C shows a state of the setting map immediately after the survey operator changes the direction toward the next setting point P4 while staying at the setting point P3 after the setting of the setting point P3 is completed. FIG. 10D shows a state of the setting map immediately after the survey operator changes the direction toward the next setting point P5 while staying at the setting point P4 after the setting of the setting point P4 is completed.

In FIG. 10A, the distance from the setting point P1 to the setting point P2 is indicated as "20 m". This is based on the design data and the control circuit CPU' obtains, based on the above described calculation, the distance between the current position of the survey operator and the setting point P2, for example, in case where the survey operator is positioned within an emitted range of the guide light PB2 in FIG. 7, the control circuit CPU locks the corner reflector 30A, and the survey operator is positioned at the current position Px. Then, the distance L' is displayed on the display part 30G.

In case where the direction sensor 30F is not provided on the mobile wireless transceiver 30C, the function as explained below may be provided on the mobile wireless transceiver 30C.

In the mobile wireless transceiver 30C, the setting map is rotated and displayed such that the survey apparatus 2 and the current position are continuously displayed at an upper part and a lower part, respectively, of the display part 30G of the mobile wireless transceiver 30C.

Thereby, when the survey operator is directed toward the survey apparatus 2, it is possible to know the direction where each of the setting points P1 to P5 exists in the actual field.

Accordingly, even in case where the mobile wireless transceiver 30C doesn't have the direction sensor 30F, the survey operator is directed to the survey apparatus 2 so that the survey operator can know the direction where the setting point where the survey operator is to be moved exists.

(Example of Survey Pole 30B)

Figure 11:
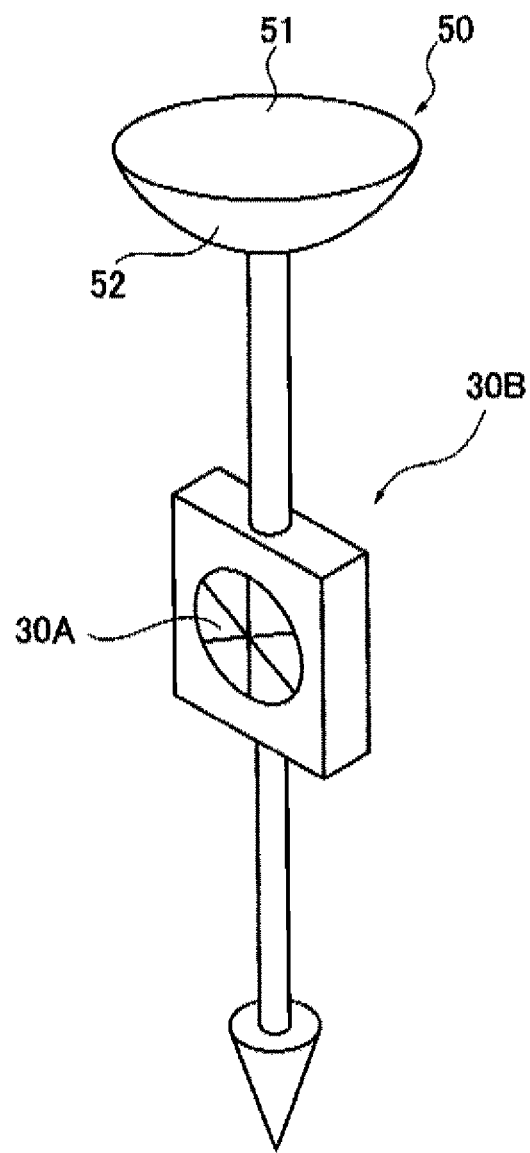
FIG. 11 is a perspective view showing an example of a survey pole used in the survey system according to an embodiment of the present invention.

Although a known survey pole can be used as the survey pole 30B in this embodiment, the survey pole as shown in FIG. 11 is preferably used.

An inverted-cone-like support locking part 50 is formed at a top of the survey pole 30B. The upper surface of the support locking part 50 is formed as a flat surface 51 of the mobile wireless transceiver 30C.

The corner reflector 30A is provided on the survey pole 30B at an appropriate height position. The survey pole 30B is hanged up under its own weight by hooking a finger on a peripheral surface 52 of the support locking part 50 to define the vertical direction.

(Example of Calculation of Control Circuit CPU' in Camera Mode)

A photographing field angle ω is previously determined. The mobile wireless transceiver 30C is capable of photographing a vicinity of each of the setting points P1 to P5 as shown in FIGS. 12 and 13.

Figure 12:
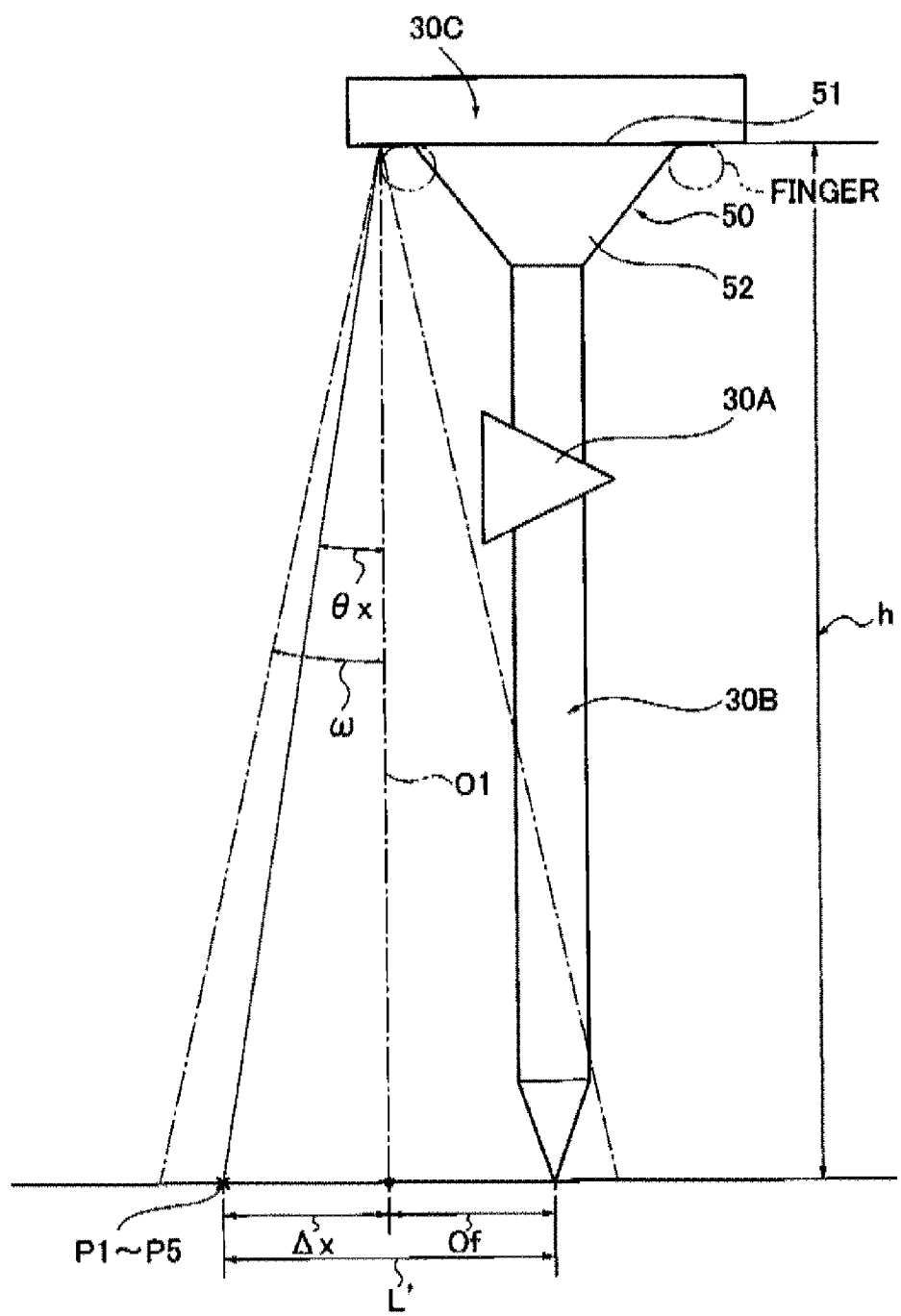
FIG. 12 is an explanatory view explaining a relationship between a height of the survey pole shown in FIG. 11 and a photographing field angle.
Figure 13:
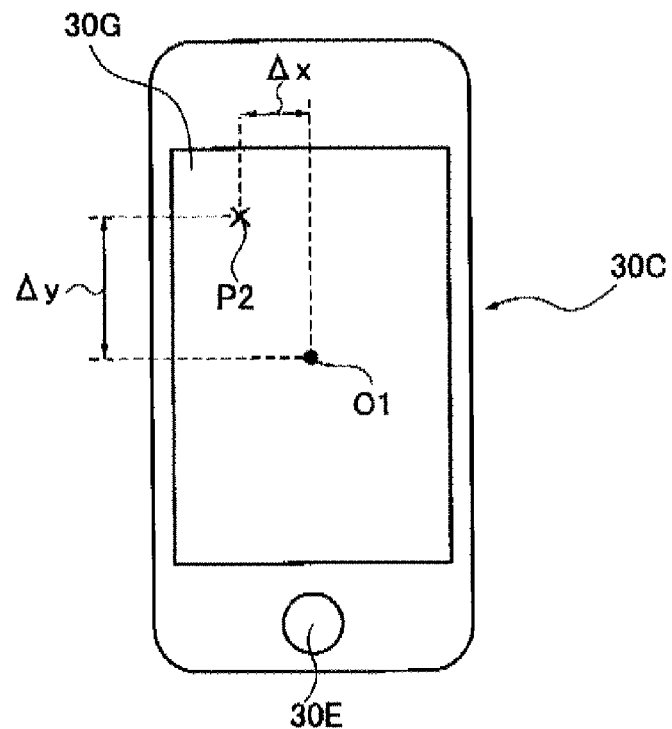
FIG. 13 is an explanatory view showing a setting point mark displayed on the display part of the mobile wireless transceiver by using the survey pole shown in FIG. 11.

FIG. 12 shows a positional relationship between each of the setting points P1 to P5 and the survey pole 30B in an X direction. The positional relationship therebetween in a Y direction is the same as that in the X direction, and therefore the illustration of the positional relationship therebetween in the Y direction is omitted.

In this embodiment, the height from the land surface to the mobile wireless transceiver 30C is h, a distance from the survey pole 30B to an optical axis O1 of the camera part 30E is Of, and a deviation amount from the optical axis O1 to each of the setting points P1 to P5 is Δx (or Δy).

When an angle between the optical axis O1 of the camera part 30E and each of the setting points P1 to P5 is θx (or θy), the following equations are obtained.

$$\Delta x = h \times \tan \theta x (\Delta y = h \times \tan \theta y) \quad (1)$$

$$L' = \Delta x + Of \quad (2)$$

Since the difference distance L' is obtained by the above-described calculation and the distance Of is previously determined, the control circuit CPU' can obtain the deviation amount Δx (or Δy) from the difference distance L' and the distance Of by using the formula (2). Since the height h is known, the angle θx (or θy) can be obtained by using the formula (1).

Therefore, the control circuit CPU' calculates the positions of the setting points P1 to P5 to be displayed on the screen of the display part 30G from the relationship between the photographing field angle ω and the angle θx (or θy) and displays the positions of the setting points P1 to P6 on the screen where the ground is actually displayed as marks. FIG. 13 shows an example of the display of the setting points P1 to P6.

In FIG. 13, a center of the screen is on the optical axis O1, and the next setting point P2 is indicated as a mark of x. The survey operator determines the setting point P2 by performing marking on the ground with the mark x as a landmark.

(Explanation of Survey Processes)

An example of the survey processes will be explained below by using schematic views.

As the survey pole 30B, although a known survey pole may be used instead of one shown in FIG. 12, the survey processes will be explained by using the survey pole shown in FIG. 12.

Figure 14:
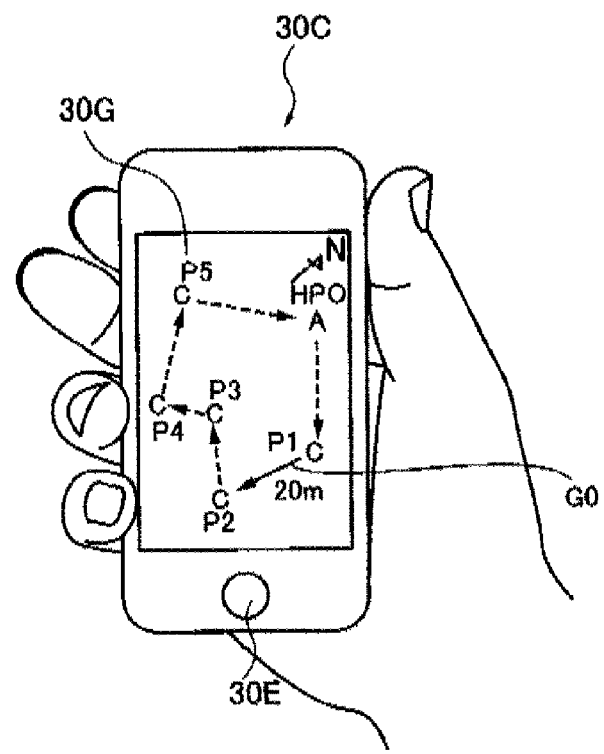
FIG. 14 is an explanatory view showing an example of a surveying step and showing a state at a time the setting of the setting point P1 is completed and a state where the survey operator is viewing or directed to the survey apparatus.

In a case where the setting of the setting point P1 is completed and the survey operator is directed toward the survey apparatus 2, the setting map is displayed on the display part 30G of the mobile wireless transceiver 30C as shown in FIG. 14.

Figure 15:
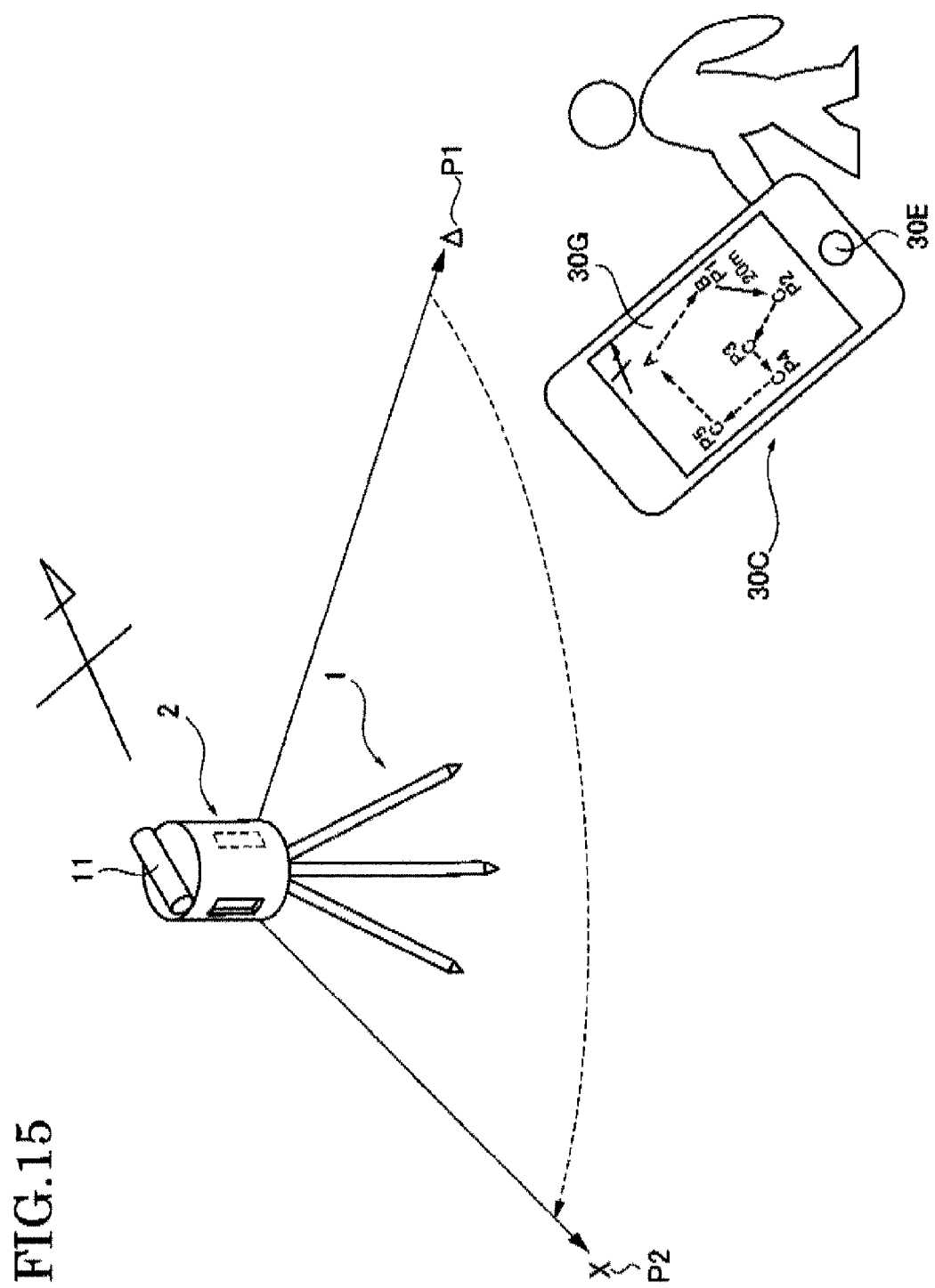
FIG. 15 is an explanatory view showing an example of a surveying step and a schematic view showing a state where the survey apparatus is directed to the next setting point.
Figure 16:
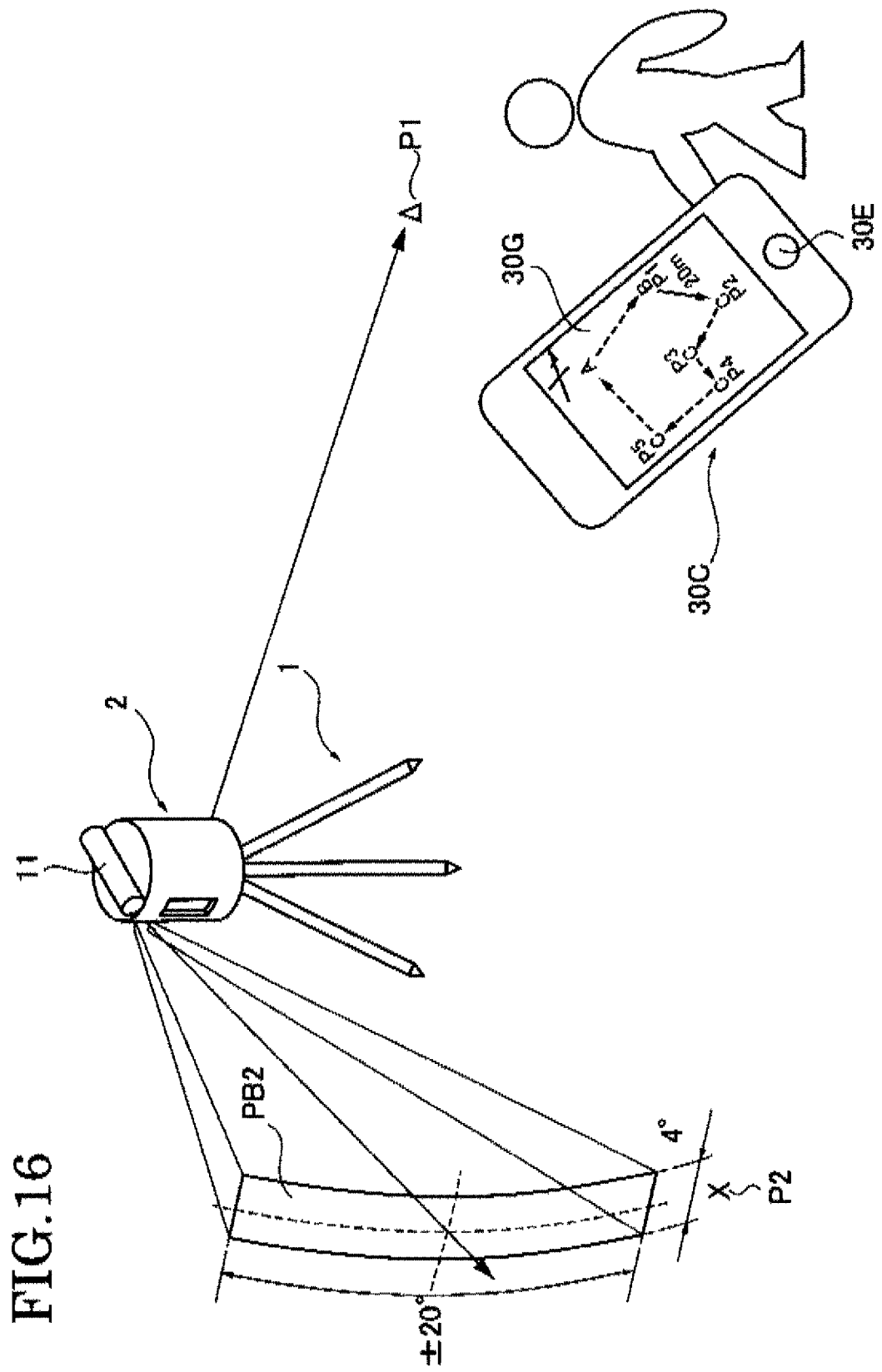
FIG. 16 is a schematic view showing a state where the guide light is emitted toward a position where the next setting point P2 is positioned.

When the setting of the setting point P1 is completed and the cylindrical part rotation permission button 30H is turned on the cylindrical part 8 is rotated as schematically shown in FIG. 15, toward the position where the next setting point P2 exists and stops rotating in a direction toward the position where the next setting point exists.

Then, the control circuit CPU turns on the laser light source 12 and the fan-like guide light PB2 elongated in a longitudinal direction, for example, a vertical direction is emitted. An emitted range in the longitudinal direction is within ±20 degrees at an angle, and an emitted range in a horizontal direction is within 4 degrees. The survey apparatus 2 is held in this state.

When the survey operator is directed such that the moving direction GO on the screen of the display part 30G is directed in the forward direction as shown in FIG. 10A, the setting map and the direction, for example, the azimuth direction are rotated relatively to the screen and the direction where the next setting point P2 exists is displayed.

In FIGS. 10A to 10D, a long side of a frame of the screen is parallel to the moving direction GO but is not always necessary to be parallel if the direction where the survey operator walks is displayed as a forward side.

There is substantially no problem if a part of the setting points may disappear from the screen when the setting map is rotated. At least the direction where the survey operator is to move needs to be indicated on the screen.

Figure 17:
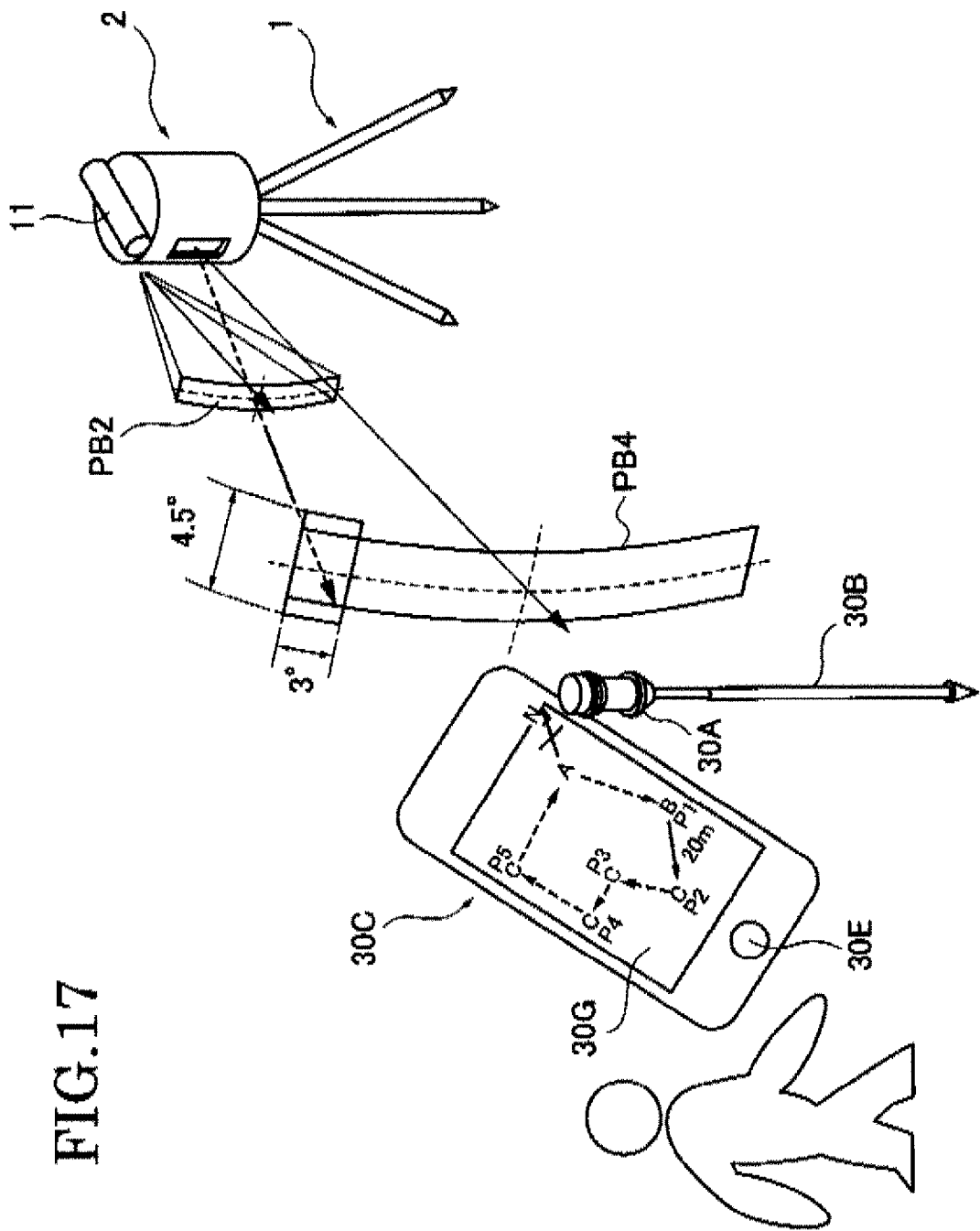
FIG. 17 is a schematic view showing a state where the guide light and a ranging light are emitted toward a position where the next setting point P2 is positioned.

The survey operator is positioned in a vicinity of the setting point P2 and arrives at a vicinity of the position where the guide light PB2 is emitted, eyes of the survey operator perceive the guide light PB2 as shown in FIG. 17.

Even if the vicinity of the setting point P2 is at a place having undulation with difference in height, the guide light PB2 has a fan-like shape elongated in a vertical direction. Therefore, even if the height of the eyes deviates from the height of the guide light emitting part 11, the survey operator can perceive the guide light PB2.

Figure 18:
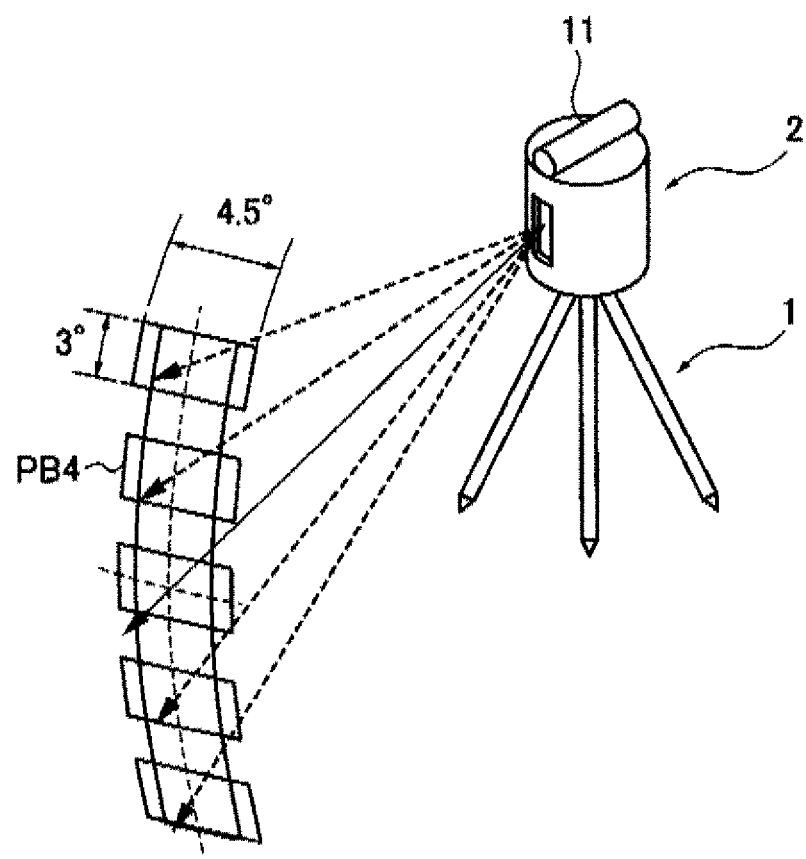
FIG. 18 is a schematic view explaining a scanning range of a scanning light.

The survey apparatus 2 searches the corner reflector 30A in a vertical direction within a range of 4.5 degrees as a horizontal angle width and 3 degrees as a vertical angle width as shown in FIG. 18. The cylindrical part 8 is scanned and reciprocated in upward and downward directions with a period of a range within about one or two seconds.

Figure 19:
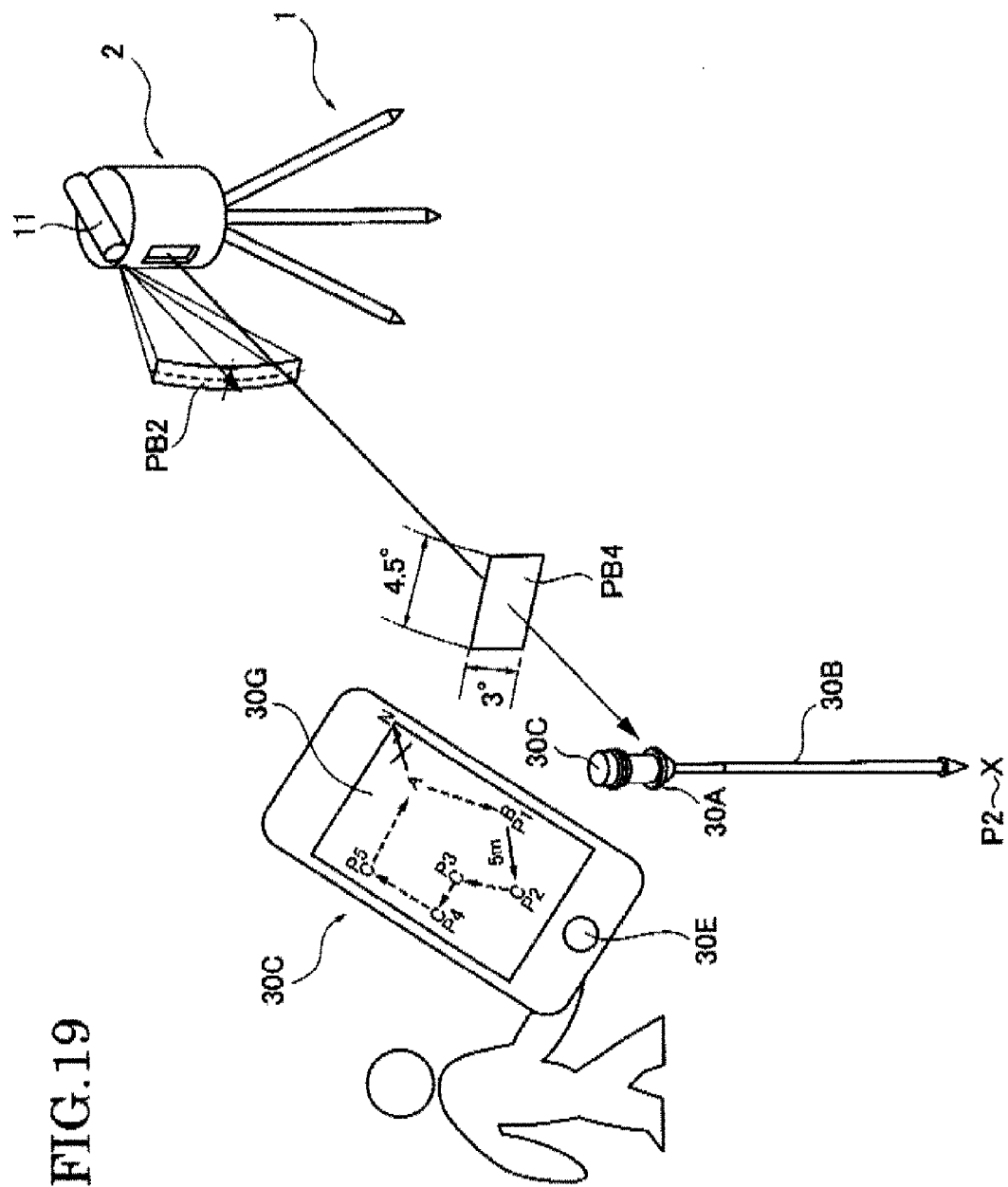
FIG. 19 is a schematic view explaining a state where a corner reflector is locked by the scanning light

When the survey operator is positioned at an area within the searched range of the corner reflector 30A and the corner reflector 30A is locked by the scanning optical system 10, the survey apparatus 2 automatically track the corner reflector 30A as shown in FIG. 19.

For example, when the survey operator reaches the current position Px which is a point shown as an example in FIG. 7, the survey apparatus 2 locks the corner reflector 30A.

When the corner reflector 30A is locked, the ranging or the ranging and the angle measurement are performed by the survey apparatus 2 and the ranging data or the ranging data and the angle measurement data (measurement data) are transmitted to the mobile wireless transceiver 30C. The mobile wireless transceiver 30C receives the measurement data and the control circuit CPU' calculates the distance from the current position Px where the survey operator is currently positioned to the next setting point P2, which is the difference distance L'.

The mobile wireless transceiver 30C controls the display part 30G to display the difference distance L' between the current position Px and the next setting point P2 together with the moving direction GO based on the difference distance L' on the screen of the display part 30G.

The survey operator moves in the direction which is indicated by the moving direction GO while viewing the display part 30G of the mobile wireless transceiver 30C and confirms if the distance between the current position Px and the next setting point P2 decreases. As described above, the survey operator can approach the setting point P2.

The mobile wireless transceiver 30C is, for example, configured to switch the mode from the setting map display mode to the camera mode when the difference distance L' between the current position Px and the next setting point P2 becomes within a predetermined value, for example, 5 m.

Figure 20:
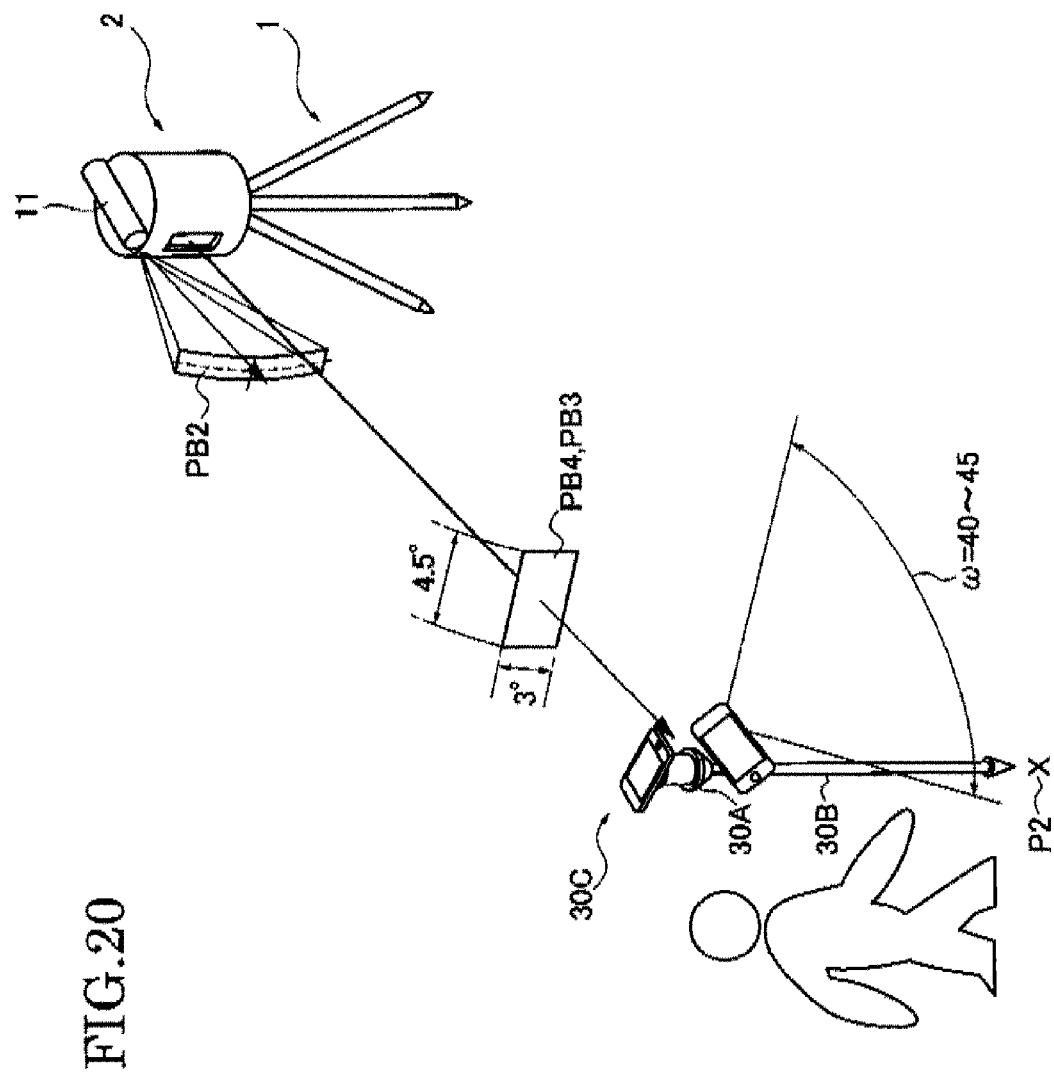
FIG. 20 is a schematic view explaining a photographing field angle of the mobile wireless transceiver.

The photographing field angle ω of the camera part 30E is, for example, as shown in FIG. 20, within a range of 40 to 45 degrees.

Figure 21:
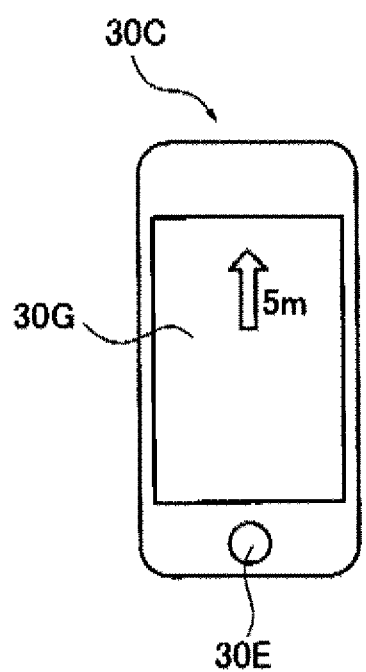
FIG. 21 is a schematic view showing an example of a displayed state of the display part of the mobile wireless transceiver in a camera mode.

When the difference distance L' between the current position Px and the next setting point P2 is a predetermined value 1 m or more and the predetermined value 5 m or less, the mobile wireless transceiver 30C displays the difference distance L' between the current position Px and the setting point P2 as a distance out of the field angle together with the direction as shown in FIG. 21.

When the distance between the current position Px and the setting point P2 becomes less than a certain value, for example, about 1 m (within the field angle), the survey operator hangs up the survey pole 30B in a vertical direction by hooking a forefinger and a middle finger on the support locking part 50 of the survey pole 30B, as shown in FIG. 12.

At this time, a tip of the survey pole 30B is preferably close to the ground surface to reduce error of the height h.

By a sequence of those operations, the ground is displayed on the display part 30G and the point P2 where the setting is to be performed is displayed on the screen, as shown in FIG. 13.

Then, the survey operator performs marking on the ground while viewing the point where the setting is to be performed, which is displayed on the display part 30G and piling on the marked point.

According to this embodiment, marking on the next setting point P2 is performed without moving the survey pole 30B so that the setting point P2 can be accurately and quickly specified.

According to a guide light device and a survey apparatus of an embodiment of the present invention, the guide light is emitted in a fan-like form in a vertical direction, and therefore the guide light can be easily found despite the eyes' height of the survey operator.

Since the guide light is a laser light, a decay of the guide light small and the guide light can be easily perceived even in case where the distance between the survey apparatus and the setting point is large.

According to a survey system using the survey apparatus of an embodiment of the present invention, the survey operator can quickly perceive the direction where the next setting point is positioned and quickly move to the next setting point.

According to a survey pole used in the survey system of an embodiment of the present invention, an inverted cone like support locking part is formed at a tip of the survey pole. The support locking part is hooked between fingers to hang up the survey pole, so that its own weight of the survey pole defines the vertical direction and the survey pole can be prevented from being inclined with respect to the ground surface.

An upper portion of the inverted cone like support locking part is formed as a flat surface and the mobile wireless transceiver is mounted on the flat surface. Accordingly, the mobile wireless transceiver can be advantageously integrally brought.

According to a mobile wireless transceiver used in the survey system of an embodiment of the present invention, the mobile wireless transceiver includes a storage part storing design data, and a display part displaying a setting map. The display part displays the setting map indicating setting points and a positional relationship between a current position of the survey operator and a survey apparatus and a direction where the survey operator is to move toward a next setting point are shown. Therefore, the survey operator can quickly move to the next setting point.

According to a mobile wireless transceiver used in the survey system of an embodiment of the present invention, the mobile wireless transceiver has a camera part and switches a mode from a mode displaying the setting map to a camera mode when a position of the survey operator reaches a vicinity of the setting point where the setting is to be performed. The setting point is displayed within a field of the camera and therefore even when the setting point is not just under the survey pole, the setting such as piling can be performed by marking if the setting point is in the field of the camera so that the setting operation efficiency is further improved.

Since the survey operator can confirm the position of the setting point and the marking of the setting point while viewing a screen of the display part, positional error between actually-marked setting point and the setting point can be reduced.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A survey system comprising:
a guide light emitting optical system that emits a fan-like visible laser light elongated in upward and downward directions as a guide light;
a cylindrical part that has a scanning optical system that searches a corner reflector provided on a survey pole and a ranging optical system that measures a distance to the corner reflector;
a driving part that rotates the cylindrical part about a vertical axis in a horizontal direction and that rotates the cylindrical part about a horizontal axis;
an angle measurement part that measures a direction of the cylindrical part;
a first storage part to store the distance to the corner reflector obtained by the ranging optical system and the direction of the cylindrical part as measurement data;
a control circuit that controls the driving part, the scanning optical system, and the ranging optical system; and
a transceiver part that transmits the measurement data stored in the first storage part to a mobile wireless transceiver at a side of the survey pole, wherein
the guide light emitting optical system is rotated about the vertical axis in a horizontal direction together with the cylindrical part;
the control circuit controls the driving part to rotate the cylindrical part toward a next setting point;
the transceiver part transmits the measurement data stored in the first storage part to the mobile wireless transceiver; and
the mobile wireless transceiver includes
a second storage part that stores design data,
a display part that displays a setting map, and
a control part that calculates the measurement data to the corner reflector, which is obtained by the ranging optical system and the angle measurement part, using the design data from the cylindrical part to the next setting point,
wherein the control part obtains a distance and a direction from a current position of the corner reflector to the next setting point based on the calculated measurement data_and displays the direction and the distance from the current position of the corner reflector to the next setting point on a screen of the display part.

2. The survey system according to claim 1, wherein
the cylindrical part has a first direction sensor and the mobile wireless transceiver has a second direction sensor, and
the control part of the mobile wireless transceiver relatively rotates the setting map such that the setting map to be displayed on the display part is matched with an actual direction based on a direction signal of the second direction sensor and the design data associated with an azimuth direction.

3. A mobile wireless transceiver used in the survey system according to claim 1, wherein
the control part displays a forward display mark indicating a movement direction from a current position of the corner reflector to the next setting point on the display part.

4. A mobile wireless transceiver used for a survey pole comprising a post having a top portion; and an inverted cone like support locking part supported by user's hooking fingers on the top portion, the support locking part having an upper surface formed as a flat surface on which a mobile wireless transceiver transmitting and receiving information with a transceiver part of a survey apparatus is fixed, a retroreflective corner reflector being provided on a middle part of the post, and the survey pole being hanged up by its own weight, the mobile wireless transceiver comprising:
a storage part that stores design data;
a display part that displays a setting map;
a direction sensor that detects a direction;
a camera part having a photographing optical system;
a transceiver part that transmits and receives data with the survey apparatus; and
a control part that controls the camera part and relatively rotates the setting map on the screen such that a positional relationship of actual setting points is matched with a positional relationship of setting points to be displayed on the screen based on a direction signal of a second direction sensor, wherein
the control part displays a movement displaying mark indicating a moving direction from a current position of the corner reflector to a next setting point on the display part.

5. The mobile wireless transceiver according to claim 4, wherein the control part switches a mode from a map mode displaying the setting map to a photographing mode photographing an image when a distance from the current position of the corner reflector to the next setting point is a predetermined value or less.

6. The mobile wireless transceiver according to claim 5, wherein the control part displays a setting point as a mark on the screen of the display part.

7. The mobile wireless transceiver according to claim 6, wherein the control part displays a distance from the survey pole to a point where the setting is to be next performed as a numeric value and a direction on the screen of the display part when the mode is the photographing mode and the distance is less than the predetermined value and a constant value or more.

* * * * *